United States Patent [19]

Harte

[11] Patent Number: 4,802,092

[45] Date of Patent: Jan. 31, 1989

[54] ELECTRIC PROBE USED TO ACTIVATE CORRECT AND INCORRECT RESPONSE AREAS IN AN INSTRUCTIONAL APPARATUS

[76] Inventor: J. Richard Harte, 10 W. Concord, Kansas City, Mo. 64112

[21] Appl. No.: 746,851

[22] Filed: Jun. 20, 1985

[51] Int. Cl.⁴ .......................... G09B 7/06; G06F 9/02
[52] U.S. Cl. .................................. 364/411; 364/580; 434/340
[58] Field of Search ................... 364/410, 411, 580; 434/320, 334, 338, 339, 340

[56] References Cited

U.S. PATENT DOCUMENTS

| | | | |
|---|---|---|---|
| 3,141,244 | 7/1964 | Smith | 434/338 |
| 3,949,489 | 4/1976 | Gallucci | 434/338 |
| 3,964,177 | 6/1976 | Wright | 434/338 |
| 4,121,355 | 10/1978 | Kimoto et al. | 434/320 |
| 4,453,920 | 6/1984 | Harte | 434/334 |
| 4,477,877 | 10/1984 | Nakamura et al. | 178/19 X |
| 4,479,032 | 10/1984 | Parnell | 178/19 |
| 4,521,199 | 6/1985 | Harte | 434/339 |
| 4,522,599 | 6/1985 | Harte | 434/339 |
| 4,561,852 | 12/1985 | Harte | 434/339 |
| 4,576,579 | 3/1986 | Harte | 434/334 |
| 4,582,955 | 4/1986 | Blesser | 178/19 |

*Primary Examiner*—Felix D. Gruber
*Attorney, Agent, or Firm*—D. A. N. Chase

[57] ABSTRACT

This invention provides the user with immediate feedback as to the correctness or incorrectness of their respones to multiple choice, true - false, and cross matching questions by the use of a hand held electric probe that produces a magnetic field; where said magnetic field is picked up by at least one of the linear electroconductive elements in each of two sets of electroconductive elements. These two sets of electroconductive elements are arranged one immediately above the other in two parallel planes that are located immediately beneath a holding frame that accurately positions instructional sheets on its upper surface. Located on the instructional sheets are answer response areas that immediately overly some of the points where one strip in the top set passes over one of the strips in the bottom set of electroconductive elements. When the user believes that he has found a correct answer, he places the electric probe over that response area on the instructional sheet. The electrical field generated by the probe energizes one conductive strip from each of the two sets of conductive strips, and a circuit in each set is activated, which locates the point where the probe was placed. This information is sent to a linked computer which uses an internal program to evaluate the response, and feed information back to the user as to his correct and incorrect responses. The computer also retains this information in its memory.

8 Claims, 5 Drawing Sheets

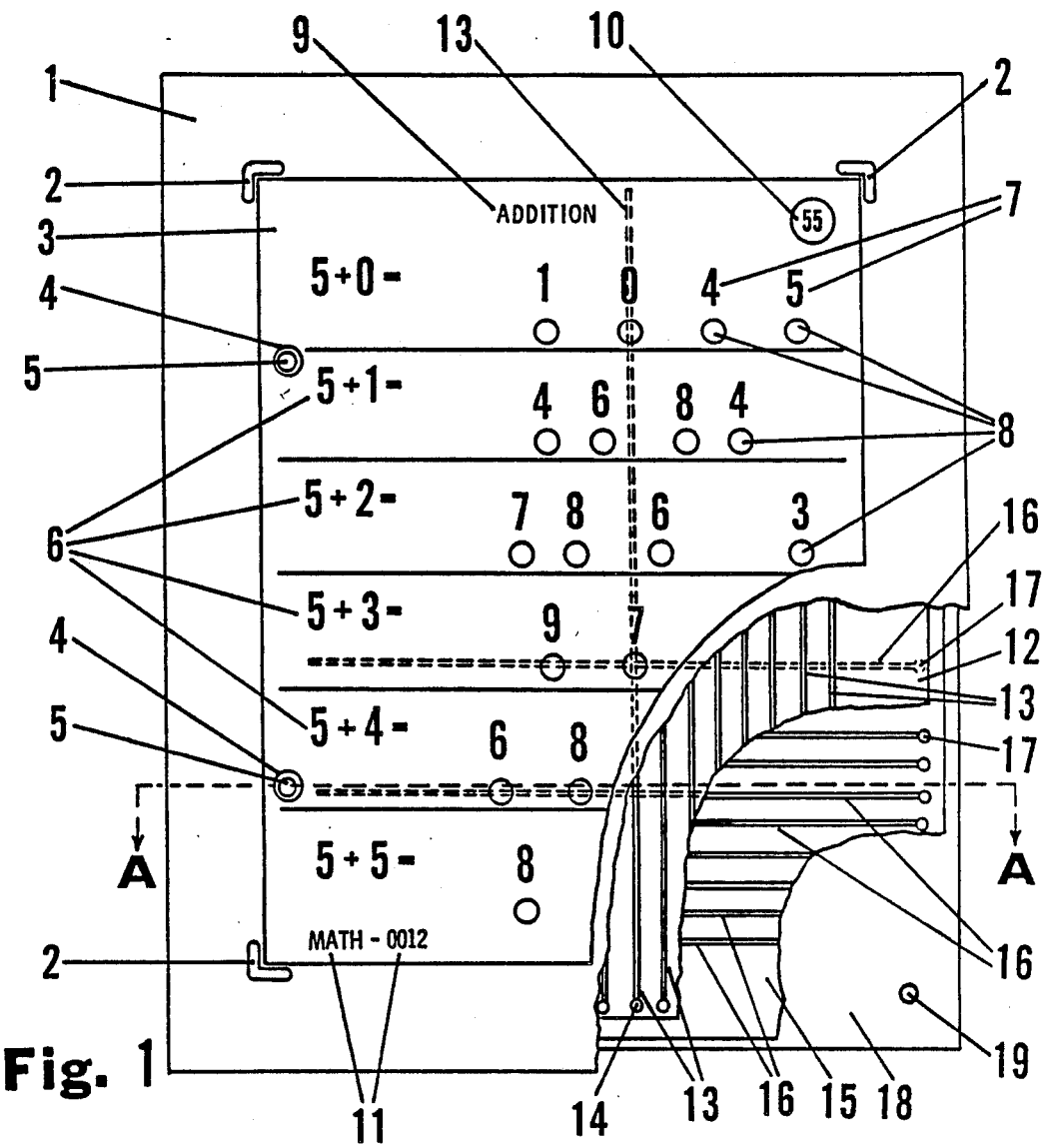
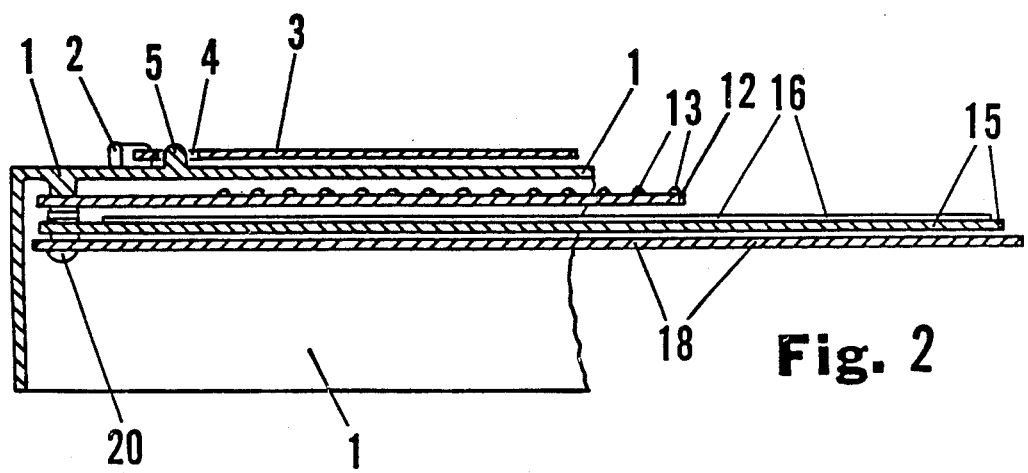

ELECTRIC PROBE USED TO ACTIVATE CORRECT AND INCORRECT RESPONSE AREAS IN AN INSTRUCTIONAL APPARATUS

BACKGROUND AND OBJECT OF THE INVENTION

This invention is an improvement in instructional and testing apparatus of the type that provides the user with immediate feedback as to their correct and incorrect responses. This invention incorporates an electronic probe that produces a magnetic field, said magnetic field is used to activate electric circuits that indicate to a computer the site on an instructional sheet where the probe was placed. The computer and related software and hardware then elevate this response and give feedback to the user as to the correctness or incorrectness of the user's responses, and retain a record of the user's responses. On command, the computer can then be directed to display a record of the user's performance, and can analyize the user's performance in various ways.

By using a magnetic field to activate electronic circuits this apparatus can be made more durable, and can be made from less expensive component parts. The features in this design largely eliminate many sources of wear from moving parts and also reduce the likelyhood of abuse by vigorous children.

This invention uses instructional sheets with printed multiple choice, cross matching, or true false questions and answers. This invention can be constructed to use the same instructional sheets that are used on a much simpler teaching machine currently being produced by the inventor. This will permit a class of students to use the simpler mechanical teaching machine for routine practice and drill, and to then use this computer linked teaching machine for recording each student's progress. In this way, teachers can spend less of their time in grading students' papers, and the cost per student will be lessened.

SUMMARY OF THE DISCLOSURE

In this invention a stylus that creates a magnetic field is used to transmit the pulses from the electromagnetic field to underlying electroconductive strips. This type of stylus is called an electronic probe. This magnetic field can penetrate nonconductive material such as molded plastic to reach the underlying linear electroconductive elements. These linear conductive elements then convey the pulses of the electromagnetic energy to electric circuits which are able, with the help of a preprogrammed computer, to determine the exact site where the probe was placed by the user.

In regard to the manner of construction and placement of component parts; the top layer is an instructional sheet which contains printed questions and answers, with response areas near each answer choice. These instructional sheets are accurately positioned on top of a holding frame. Below the upper surface of this holding frame are located two sets of electroconductive strips. These linear electroconductive strips are arranged in two parallel planes, one immediately above the other. These two sets of conductive strips are arranged so that the individual elements in one set do not physically contact the individual elements in the other set as the elements on the top set cross over the elements in the underlying set. The individual elements in each of the two sets are linked to electric circuits in such a way that the location of each strip can be identified by a variation in the quality or quantity of the electromagnetic pulses as these are processed by the electronic circuits for that particular set of conductive strips. Thus the two dimensional field that is located on the instructional sheets in terms of the placement of answer response areas can be defined in terms of electromagnetic pulses as these are picked up by the individual linear conductive strips that underlie the instructional sheet, and as these pulses from the electronic probe are modified by the two sets of electronic circuits; one set of circuits being incorporated as a part of each set of linear conductive strip elements. The linear electroconductive strip elements in the two sets of elements may be arranged in a grid pattern, or in a non grid patern such as when one set of elements is arranged to cross the other in a diagonal manner, or when one set is curvilinear or undulating, or when one set is arranged in a zig-zag manner.

This instructional and testing apparatus can also be constructed so that at some of the points where one set of linear conductive elements pass over the elements in the second set, that these points of crossing, or points of intersection can also be used to indicate alpha-numeric symbols and other symbols, in a manner similar to those on an electronic typewriter, except that it is not downward pressure that activates the underlying switching action, but that it is rather the pulses from an electronic probe of the type described previously.

This invention uses a computer and related hardware and software to give feedback to the user as to the correctnss or incorrectness of their answer choices.

BRIEF DESCRIPTION OF THE DRAWINGS

FIG. 1. is a top view of the instructional apparatus which shows a partially cut away view of some of the components as they are layered, one component on top of another.

FIG. 2. is a view taken from along broken lines A—A in FIG. 1. This view illustrates the top to bottom relationship of the components that are shown in FIG. 1.

FIGURES: 6A, 6B, 6C, 6D, and 6E, illustrate different ways in which the electromagnetic pulses from the electronic probe may be processed in the initial phase of electric circuit processing of the signals received from the probe.

Figure 5:
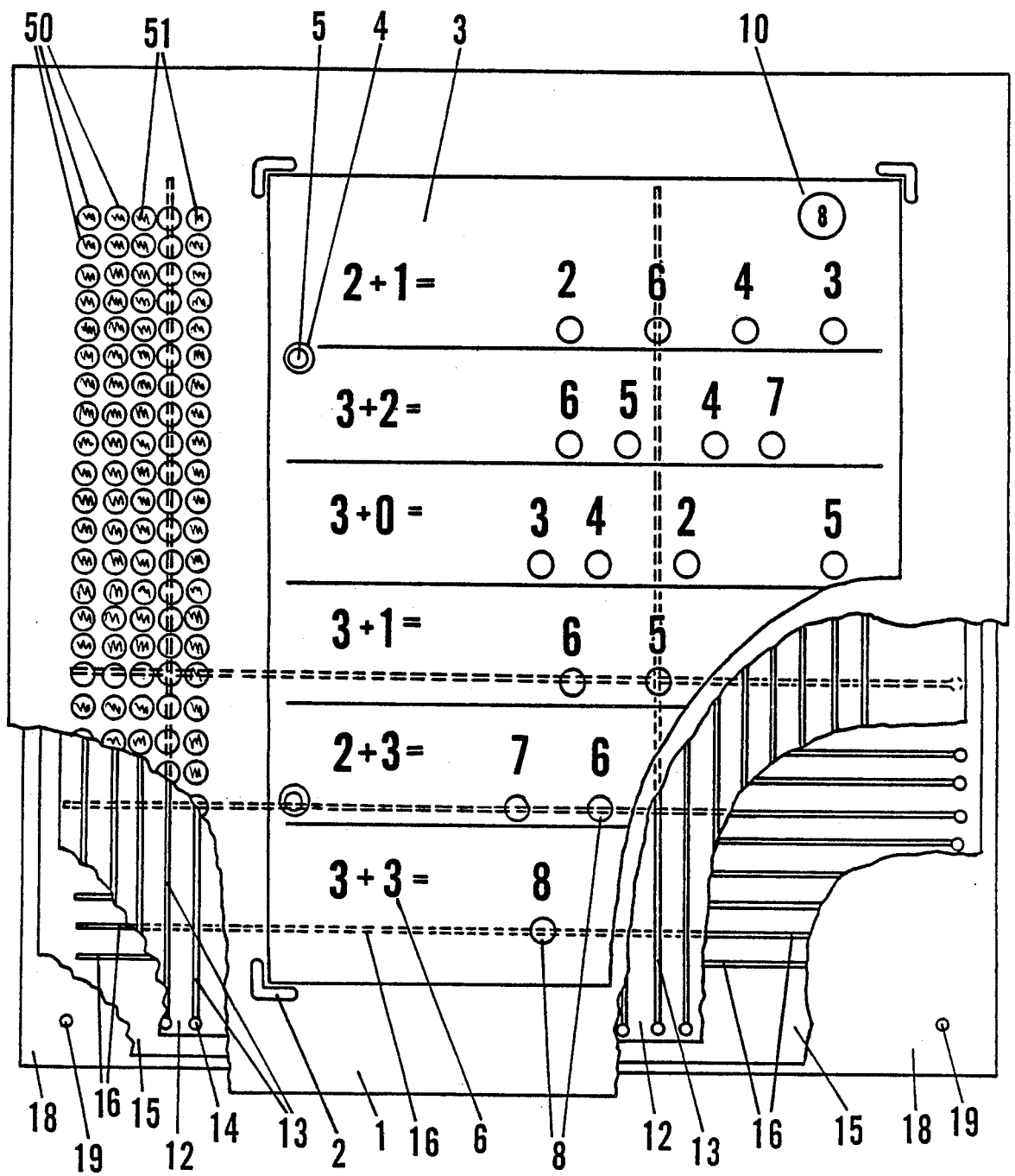
FIG. 5 shows another embodyment of this invention where a part of the apparatus is used as an input source for alphanumeric and other symbolic codes to input data into the computer.
Figure 7A:
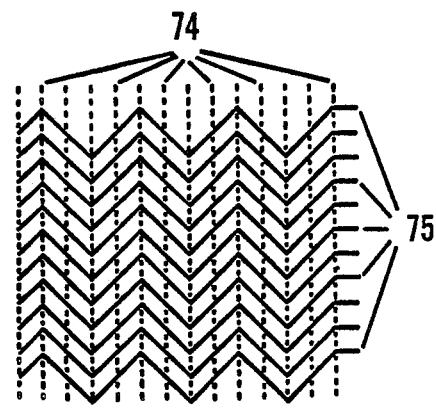
Figure 7:
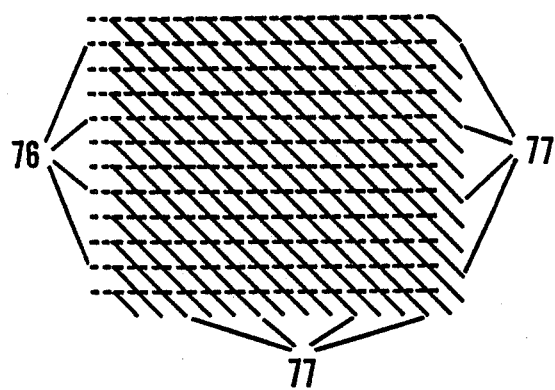
Figure 7:
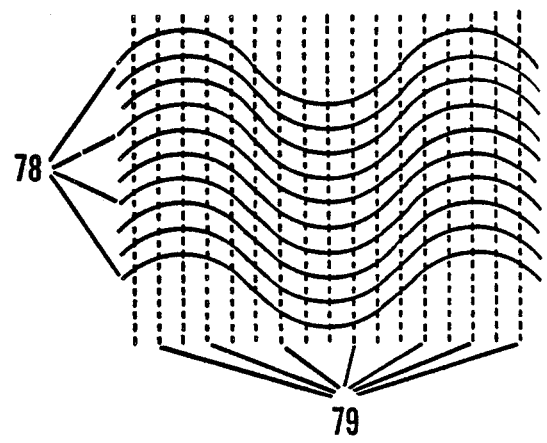

FIGS. 7A, 7B, and 7C, illustrate different ways in which the two sets of linear electroconductive strips may be arranged in a pattern other than a grid pattern as is illustrated in FIGS. 1 and 5.

DETAILED DESCRIPTION OF THE INVENTION

FIG. 1 is a top view of some of the main components of this invention which has a holding frame 1. Extending upward from holding frame 1, are four corner positioning posts 2. These corner positioning posts 2, in conjunction with the two positioning pegs 5, permit rapid and accurate placement and removal of instructional sheet 3 from the working surface of holding frame 1. Through holes 4 in instructional sheet 3 assure proper and accurate positioning of instructional sheet 3 on holding frame 1. Printed on instructional sheet 3 are a multiplicity of questions 6, answer choices 7, a title 9, a sheet number 10, and a series code number 11. Located adjacent to each answer choice 7, is a response area 8. Response areas 8 may be printed on instructional sheet 3, or may be through holes punched in instructional sheet 3. Underlying the nonconductive working surface of holding frame 1 is a nonconductive sheet of material 12 that has linear electroconductive strip elements 13 attached to its upper surface. Conductive strips 13 have terminal endings 14 where other individual electrical conductors are attached to make proper electrical connections with electronic circuits. Another nonconductive sheet of material 15 underlies nonconductive sheet 12 in a parallel plane with sheet 12. Attached to the upper surface of nonconductive sheet 15 are a number of individual conductive strip elements 16 that cross under individual conductive strip elements 13, but do not physically contact individual electroconductive strip elements 13. Underlying nonconductive sheet 15, is a conductive sheet 18 which contains a number of alignment holes 19.

FIG. 2. FIG. 2 is a cross sectional view taken from along broken line A—A in FIG. 1, and looking in the direction indicated by the arrows in broken line A—A. This view shows more clearly the top to bottom space relationships of holding frame 1, corner positioning post 2, instructional sheet 3, positioning peg 5 and through hole 4; and the relationship of these components to nonconductive sheet 12, electroconductive linear strips 13, nonconductive sheet 15, conductive strips 16, and conductive sheet 18. FIG. 2 also shows the head of a screw 20 that has been placed through a hole 19 (see FIG. 1) in sheet 18, and through similarly located holes in sheets 15 and 12 to properly allign these sheets on the under side of holding frame 1, and to hold these sheets permanently in this position.

Figure 3:
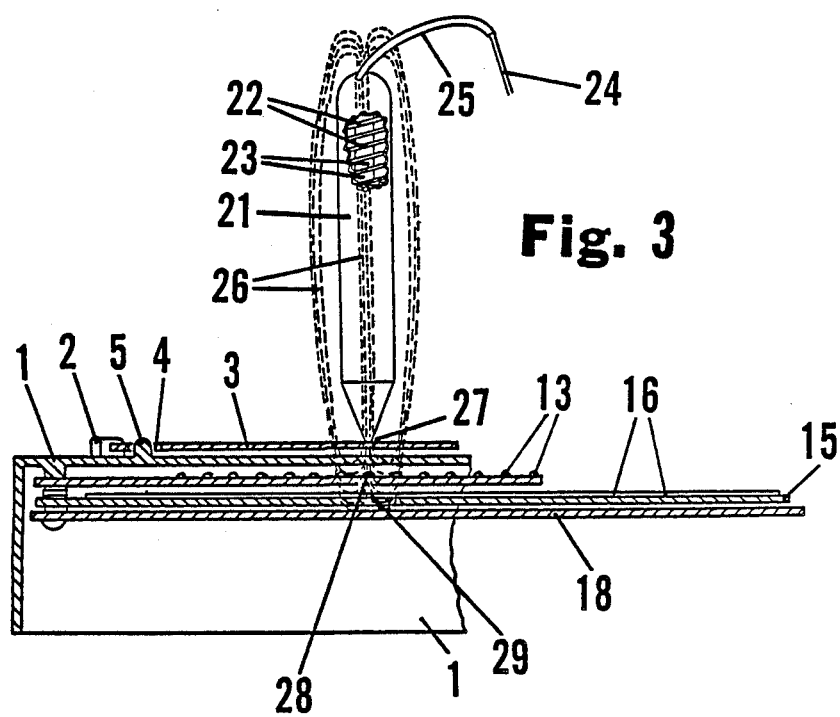
FIG. 3. shows the use of an electronic probe that produces an electromagnetic field, and illustrates how the individual linear conductive strips in the two sets of conductive strips are energized by the electromagnetic field that is put out by this probe.

FIG. 3. The lower part of FIG. 3 is identical to FIG. 2, but in addition it shows the placement of a hand held electronic probe in the upper part of FIG. 3. In FIG. 3., hand held electronic probe 21 has inside the probe a coil of electrical conductor material 22, and a metalic magnetic core 23. Electrical conductors 24 extend to probe 21 by way of cable 25. When coil 22 is energized by current pulses from conductors 24 an electromagnetic field 26 is generated. Metalic magnetic core 23 helps to strengthen and sharpen the focus of electromagnetic field 26. When tip 27 of electronic probe 21 is placed over a response area 8 (FIG. 1) pulses of electromagnetic energy are conveyed to underlying electroconductive linear strips 13 and 16. Though other linear conductive strips may receive some energy from electromagnetic field 26, those conductive strips 13, and 16 that are immediately under tip 27 will receive the strongest pulses of energy. Those strongest pulses of electromagnetic energy pass through strips 13 at point 28, and through strips 16 at point 29.

Figure 4:
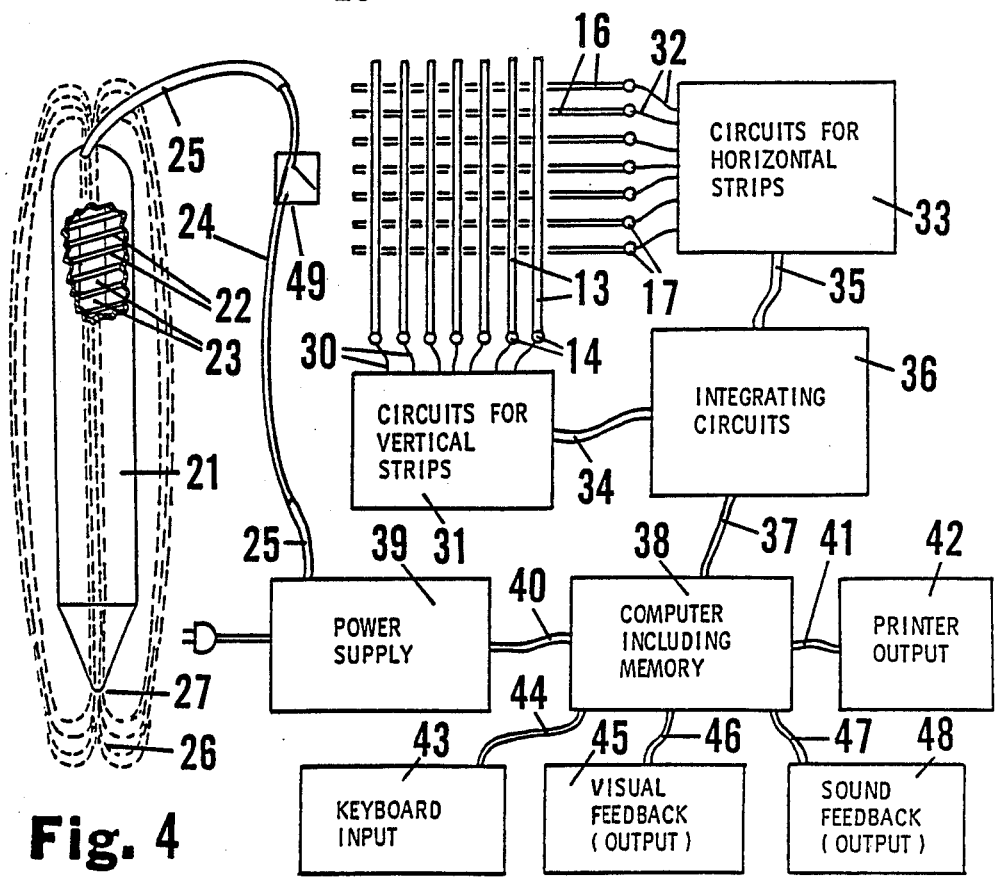
FIG. 4. shows the relationship of the two sets of conductive strips to their accompanying electronic circuits; to the computer and its related hardware; to the electromagnetic probe; and to the power supply.

FIG. 4. FIG. 4 shows the electrical connections of the various components used in this invention. In FIG. 4 individual conductive strips 13 end in individual terminal connectors 14. Electrical conductors 30 connect terminal connectors 14 with circuits for vertical strips 31. In a similar manner, electrical connectors 32 connect terminal connectors 17 with circuits for horizontal strips 33. Cables 34 and 35 connect circuits for vertical strips 31 and circuits for horizontal strips 33 with integrating circuits 36. Cable 37 connects integrating circuits 36 to computer 38. Computer 38 is connected to printer 42, keyboard input 43, visual feedback 45, and sound feedback 48 by cable connectors 41, 44, 46, and 47. Computer 38 is connected to power supply 39 by cable 40. Power supply 39 is connected to electronic probe 21 by cable 25 which contains electrical conductors 24. A switch connection 49 is shown in one of electrical conductors 24. Switch 49 permits the user to turn on the current to coils 22 only after tip 27 of electronic probe 21 has been properly positioned over a response area 8 (see FIG. 1).

FIG. 5 shows a variation of this invention which permits the same holding frame 1 to be used to accurately and rapidly position instructional sheets 3, and also to permit a part of the working surface of holding frame 1 to be used as a way for the user to input alphanumeric and similar symbols into computer 38 by using the same electronic probe to activate electronic circuits by energizing electroconductive strips 13 and 16. In FIG. 5, response areas 50 have symbols 51 printed or embossed on the upper surface of holding frame 1. The user uses the electronic probe in the manner described under FIG. 3 to indicate to computer 38 (FIG. 4) what sequence of symbols the user is asking the computer 38 to process.

FIGS. 6A, 6B, 6C, 6D, and 6E illustrate different ways in which electromagnetic pulses that are picked up by linear conductive strips 13 and 16 and relayed via terminals 14 and 17, and via electrical connectors 30 and 32 can be processed in the first phase of electronic processing within circuits for vertical strips 31 and circuits for horizontal strips 33. Though only circuits for horizontal strips 33 are illustrated, it is understood that an identical set of processes can be used in the first phase of signal processing in circuits for vertical processing 31.

FIG. 6A shows the use of outer capsule 52 and inner capsule 53 that separate the first phase of electronic signal processing which uses resistors 54, 55, and 56 (and other similar resistors) from later signal processing prior to relaying this information to integrating circuits 36 by way of cable 35. Electrical conductor 57 transmits this modified signal into the internal capsule 52 for further processing by electronic circuits.

FIG. 6B shows the use of coils 59, 60, 61 (and other similar coils) to create an inductance difference in the preliminary phase of processing inputs from the linear electroconductive strips.

FIG. 6C shows the use of capacitors 63, 64, 65, (and similar capacitors), where these capacitors have a different value, and thus create a different capacitance input in the preliminary phase of processing inputs from the linear conductive strips.

Figure 6:
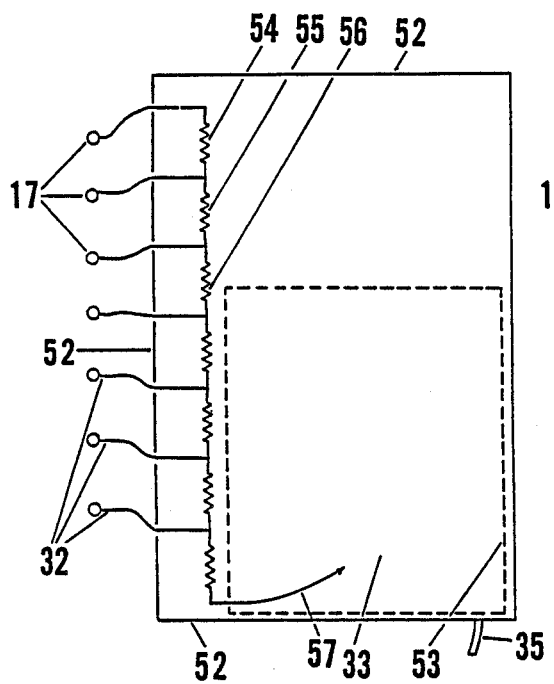
Figure 6:
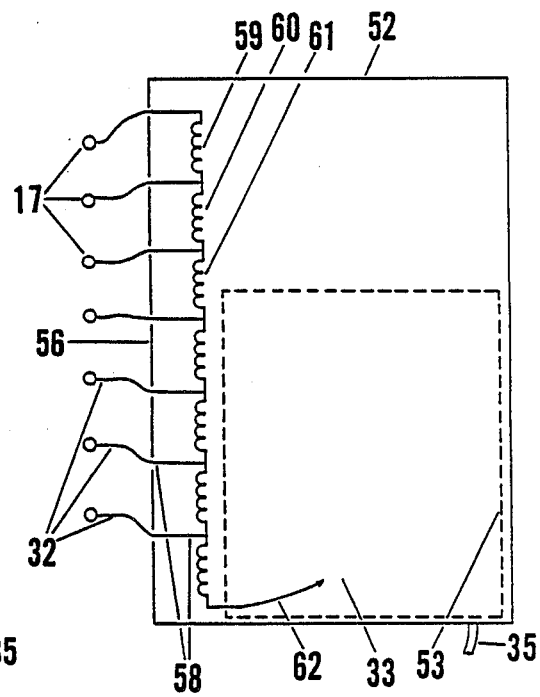
Figure 6:
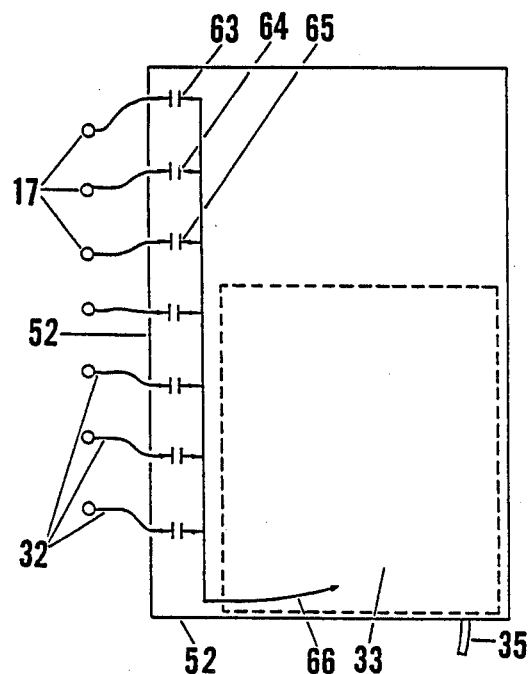
Figure 6:
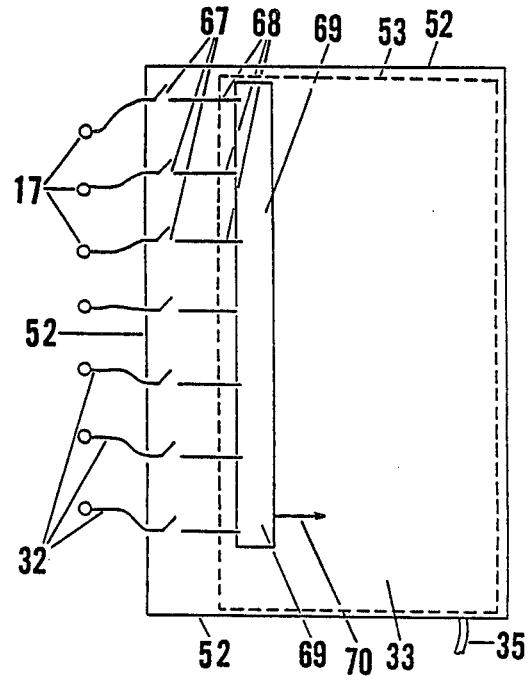
Figure 6:
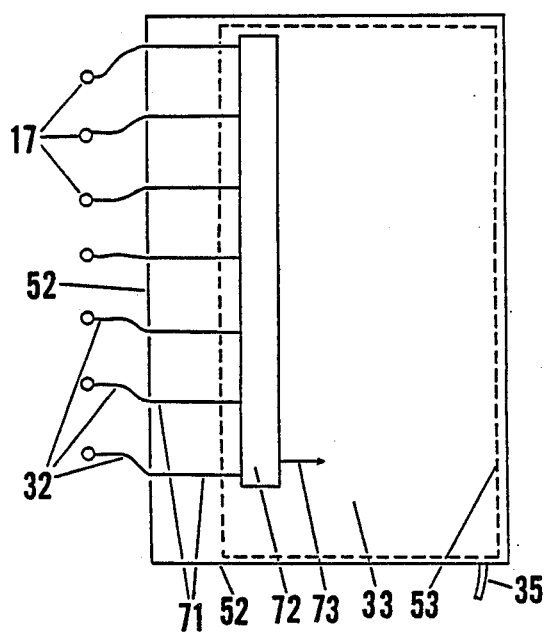

FIG. 6D shows the use of microswitches 67 that are activated by small electromagnetic currents to do the preliminary processing of the magnetic pulses coming in from the linear electroconductive strips. FIG. 6 D shows connectors 68 connecting microswitches 67 with microprocessor 69. Microprocessor 69 functions to assign input from each different conductive strip a different code that can be further processed by intregrating circuits 36 and computer 38 (see FIG. 4).

FIG. 6E shows direct input from terminals 17 by way of connectors 32 outside of capsule 52 to cirect connectors 71 within capsule 52 to microprocessor 72 that is located within inner capusle 53. Micro processor 72 functions to assign input from the individual conductive strips an individual code that is further processed within integrating circuits 36 and computer 38 (see FIG. 4).

FIGS. 7A, 7B, and 7C illustrate different patterns where the conductive strips are arranged in a pattern other than the grid pattern illustrated in FIGS. 1 and 5.

FIG. 7A. In this figure conductive strips 74, the bottom or underlying set, are shown as broken vertical lines, and the upper set are zig-zag, and are shown as number 75.

FIG. 7B. In this figure conductive strips 76 are horizontal and are indicated as the bottom set of strips by a broken line. Conductive strips 77, the top set are placed at a diagonal to conductive strips 76.

FIG. 7C. In this figure, the bottom set of conductive strips are indicated by broken line 79, and the upper most set of conductive strips are curvilinear and are indicated by lines 78.

What is claimed as new in this invention is:

1. An instructional and testing apparatus comprising:
    an instructional or testing sheet having answer response areas thereon,
    first and second, generally planar sets of elongated conductive elements underlying said sheet, electrically insulated from each other and arranged in a crossing pattern to present points of intersection as viewed orthogonally,
    holding means for receiving said sheet and aligning the same relative to said pattern with said response areas in register with corresponding points of intersection therebeneath,
    a hand-held probe having a tip and means for producing a magnetic field projecting from said tip,
    a programmable digital computer,
    circuit means operably interconnecting said first and second sets of elements and said computer for identifying individual points of intersection energized by the user positioning said probe tip at selected response areas and for inputting the point identification information to the computer, and
    said computer being programmed to respond to the input point identification information and determine the correctness or incorrectness of the user's answers.

2. The apparataus as claimed in claim 1, further comprising means operably coupled with said computer and responsive to the determination of the correctness or incorrectness of the user's answers for giving feedback to the user with respect to the correctness or incorrectness of responses, whereby the apparatus may be used in an instruction only mode.

3. The apparatus as claimed in claim 2, wherein said computer has a memory for retaining a record of the user's answers for later evaluation, processing and analysis, whereby the apparatus may be used in an instruction and evaluation mode.

4. The apparatus as claimed in claim 1, wherein said computer has a memory for retaining a record of the user's answers for later feedback to the user, whereby the apparatus may be employed in a test only mode.

5. The apparatus as claimed in claim 1, wherein said first and second sets of elements extend beyond the overlying instructional or testing sheet to present additional points of intersection clear of said sheet, said holding means being provided with a surface overlying said additional points having alpha-numeric or other indicia thereon corresponding to the underlying points, and wherein said indicia represent relevant input data that may be selected by said probe including identification of the user and the instructional or testing sheet to which the user is responding, said circuit means having means for identifying said additional points energized by user selection with said probe and for inputting such identification to said computer.

6. The apparatus as claimed in claim 1, wherein said ciruit means has means responsive to energization of said elements by said magnetic field for identifying the element of each of said first and second sets receiving the strongest field excitation.

7. The apparatus as claimed in claim 1, wherein the elements of each of said sets are substantially straight and parallel to one another to define a grid presenting said pattern.

8. The apparatus as claimed in claim 1, wherein the elements of one of said sets extend in directions such that said pattern has a non-grid configuration.

* * * * *